(12) United States Patent
Campau

(10) Patent No.: US 8,734,072 B2
(45) Date of Patent: May 27, 2014

(54) LOCKING THREADED FASTENER

(75) Inventor: Daniel N. Campau, Ada, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 100 days.

(21) Appl. No.: 13/359,942

(22) Filed: Jan. 27, 2012

(65) Prior Publication Data

US 2012/0301246 A1 Nov. 29, 2012

Related U.S. Application Data

(63) Continuation-in-part of application No. 13/113,357, filed on May 23, 2011, now Pat. No. 8,439,616.

(51) Int. Cl.
*F16B 39/20* (2006.01)
*F16B 39/34* (2006.01)

(52) U.S. Cl.
CPC ........ *F16B 39/20* (2013.01); *F16B 39/34* (2013.01)
USPC .......................................... 411/252; 411/262

(58) Field of Classification Search
USPC .................. 411/246–252, 303, 429, 431, 262
See application file for complete search history.

(56) References Cited

U.S. PATENT DOCUMENTS

| | | | |
|---|---|---|---|
| 152,249 A | 6/1874 | Penfield | |
| 422,027 A | 2/1890 | Marshall | |
| 900,589 A | 10/1908 | Ratcliffe | |
| 988,911 A | 4/1911 | Terry | |
| 1,017,845 A | 2/1912 | Brown | |
| 1,081,965 A | 12/1913 | Kester | |
| 1,179,446 A | 4/1916 | Mennie | |
| 1,267,656 A | 5/1918 | Goserud | |
| 1,440,324 A | 12/1922 | Whitaker | |
| 1,550,282 A * | 8/1925 | Rennerfelt | 411/303 |
| 1,630,958 A | 5/1927 | Mauch | |
| 1,830,919 A | 11/1931 | Sundh | |
| 1,830,920 A | 11/1931 | Sundh | |
| 1,909,400 A * | 5/1933 | Hall | 411/262 |
| 1,929,169 A | 10/1933 | Hall | |
| 2,233,889 A | 3/1941 | Hood | |

(Continued)

FOREIGN PATENT DOCUMENTS

| | | |
|---|---|---|
| AT | 375452 | 8/1984 |
| CH | 209896 | 5/1940 |

(Continued)

OTHER PUBLICATIONS

International Search Report for PCT/US2012/071114 dated Mar. 25, 2013.

(Continued)

*Primary Examiner* — Flemming Saether
(74) *Attorney, Agent, or Firm* — Warner Norcross & Judd LLP

(57) ABSTRACT

A locking fastener includes a fastener body, a locking band within the fastener body, and a retainer secured to the fastener body to retain the locking band within the fastener body. The locking band includes first and second tangs that fit within recesses in the fastener body to limit angular movement of the tangs. The tangs and the recesses are dimensioned to control the torque required to remove the fastener from a threaded member. The retainer defines a central circular hole corresponding to the diameter of a threaded member on which the fastener is mounted.

12 Claims, 7 Drawing Sheets

(56) References Cited

U.S. PATENT DOCUMENTS

| | | | |
|---|---|---|---|
| 2,255,948 A * | 9/1941 | Swanstrom | 411/303 |
| 2,320,032 A * | 5/1943 | Danforth | 411/303 |
| 2,432,805 A * | 12/1947 | Robertson | 411/246 |
| 2,562,621 A | 7/1951 | Larson | |
| 2,587,560 A | 2/1952 | Widmer | |
| 2,823,725 A | 2/1958 | Trinca | |
| 3,391,720 A | 7/1968 | Morse | |
| 3,565,149 A | 2/1971 | Wetzel | |
| 3,589,423 A | 6/1971 | Metz | |
| 3,701,372 A | 10/1972 | Breed | |
| 4,069,855 A | 1/1978 | Petroshanoff | |
| 4,357,726 A | 11/1982 | Trimmer | |
| 4,692,078 A | 9/1987 | Dessouroux | |
| 4,983,085 A | 1/1991 | Gray | |
| 5,449,259 A | 9/1995 | Clohessey | |
| 5,529,348 A | 6/1996 | Wasserman et al. | |
| H1588 H | 9/1996 | Arney | |
| 6,015,251 A | 1/2000 | Chung | |
| 8,021,093 B2 | 9/2011 | Campau | |
| 2009/0095359 A1 | 4/2009 | Campau | |
| 2009/0097940 A1 | 4/2009 | Campau | |
| 2010/0266364 A1 | 10/2010 | Campau | |

FOREIGN PATENT DOCUMENTS

| | | |
|---|---|---|
| EP | 1760334 | 3/2007 |
| FR | 1032330 | 7/1953 |
| FR | 1101421 | 10/1955 |
| FR | 1377030 | 10/1964 |
| FR | 2544030 | 10/1984 |
| GB | 04780 | 0/1909 |
| GB | 27703 | 0/1910 |
| GB | 221456 | 9/1924 |
| JP | 2003307210 | 10/2003 |

OTHER PUBLICATIONS

Written Opinion for PCT/US2012/071114 dated Mar. 25, 2013.
International Search Report and Written Opinion for International Application No. PCT/US2011/049254, mailed Oct. 28, 2011.
PCT Notification of Transmittal of the International Search Report and the Written Opinion of the International Searching Authority, or the Declaration; International Search Report; Written Opinion of the International Searching Authority, dated May 31, 2010 in PCT Application No. PCT/US2010/026196.
U.S. Appl. No. 12/880,580, filed Sep. 13, 2010, entitled "Locking Threaded Fastener".
PCT Notification of Transmittal of the International Search Report and the Written Opinion of the International Searching Authority, or the Declaration; International Search Report; Written Opinion of the International Searching Authority, dated Dec. 19, 2008 in PCT Application No. PCT/US2008/076155.
International Search Report and Written Opinion for International Application No. PCT/US2012/037183, mailed Aug. 6, 2012.

* cited by examiner

LOCKING THREADED FASTENER

BACKGROUND OF THE INVENTION

The present invention relates to locking threaded fasteners, and more particularly to lock nuts that include a spring coil or band as a locking element.

Lock nuts can include a spring coil or band as a locking element. Typically, the locking element includes one end bent radially outwardly and anchored with respect to the nut, for example, with the bent end fitted within a slot in the nut. Under loosening torque, the nut creates a tension load on the locking element, which causes the element to tighten its grip to prevent unintended relative rotation (i.e. loosening). The opposite force, compression, is created on the locking element during tightening (i.e. installation), which causes the locking element to loosen its grip so that there is relatively low installation torque.

This locking system typically requires special tools or other means to enable removal of the nut. However, a number of lock nuts do not require special tools, for example, as disclosed in U.S. Pat. No. 8,021,093 issued Sep. 20, 2011 to Campau; U.S. application Ser. No. 12/880,580 filed Sep. 13, 2010 by Campau; and U.S. application Ser. No. 13/113,357 filed May 23, 2011 by Campau. The lock nut disclosed in the '357 application includes a locking element that slips at a controlled removal torque.

Unfortunately, the through slots of the noted lock nuts permit dirt, grease, and other contaminants to enter the lock nut through the slot. These contaminants can increase or decrease the locking force of the lock spring, depending on the contaminant. Such a change can make the lock nut unsuited for its intended application.

SUMMARY OF THE INVENTION

The disclosed lock nut provides improved structure and function over previous lock nuts. The new lock nut maintains the simplicity of the previous lock nuts, while improving performance. Consequently, the new lock nut provides an improved balance of simplicity, cost, and performance.

According to a first aspect of the invention, the lock nut includes a nut body, a locking element, and a retainer. The locking element is (a) circumferentially surrounded without interruption by the nut body and (b) at least partially axially covered by a retainer. The locknut includes first and second recesses. A first tang on the lock spring is located within the first recess, and second tang on the lock spring is located within the second recess. The locking element and the recesses are dimensioned so that the second tang comes into contact with a wall of the second recess when a predetermined amount of removal torque is applied to the lock nut. This contact limits the amount of tension applied to the locking element, so that (1) the removal torque can be controlled and (2) the locking element is not damaged.

According to a second aspect of the invention, the locking element includes a coil portion and two tangs extending from the coil portion. The locking element is located within and circumferentially surrounded without interruption by the nut body. The first tang is fixed with respect to the nut body to prevent angular movement of the first tang with respect to the body. The retainer at least partially axially covers the locking element to protect the locking element from dirt, grease, and other contaminants. The retainer cover may have a diameter corresponding to the external diameter of the threaded member on which the lock nut is mounted so as to seal the cover against the threaded member. The retainer portion may be elastic to enhance the seal against the threaded member.

These and other advantages and features of the invention will be more fully understood and appreciated by reference to the description of the current embodiments and the drawings.

DESCRIPTION OF THE CURRENT EMBODIMENTS

Figure 1:
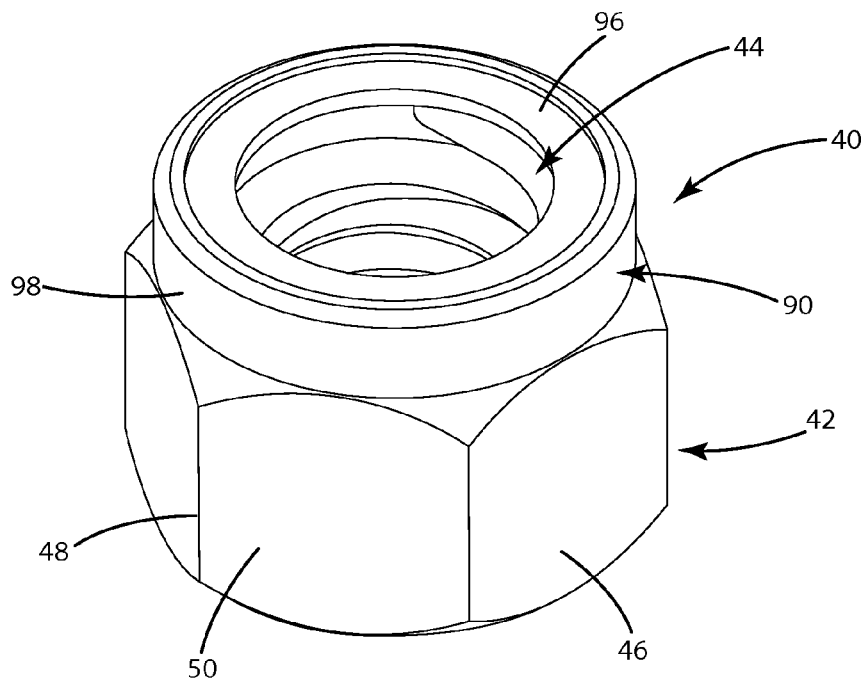
FIG. 1 is a perspective view of a first embodiment of the locking fastener.

Before the embodiments of the invention are described, it pointed out that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. Also, it is pointed out that the phraseology and terminology used herein are for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

I. First Embodiment

A locking threaded fastener constructed in accordance with a first embodiment of the invention is illustrated in FIGS. 1-5 and generally designated 40. Though shown in FIGS. 1-5 as a retaining nut or a lock nut, the concepts of the present invention can be incorporated into a variety of fasteners as will be recognized by those skilled in the art.

The threaded fastener 40 includes a body 42 and a locking element, spring, or band 44. The body 42 includes a hex-shaped outer portion 46 configured to be engaged and driven by a conventional driving tool (not shown). The hex-shaped portion 46 includes a plurality of corners 48 and a plurality of flats 50 extending therebetween. Alternatively, the body 42 may be square, otherwise polygonal, or any other shape. The body 42 may also be shaped to be engaged by any conventional driving tool, now known or later developed.

The body 42 defines a bore 52, which is at least partially threaded along its length. As perhaps best shown in FIG. 3, the bore 52 includes a first portion 54 that is threaded and a second portion, pocket, recess, or retainer wall 56 that is unthreaded. The diameter of the unthreaded portion 56 is greater than the diameter of the threaded portion 54. A lower lip 60 separates the first and second portions 54, 56.

The body 42 further defines a first or anchor recess 62 and a second or release recess 64 communicating with the bore 52. Alternatively, one or both of the recesses 62,64 may be defined by the retainer portion 90. The first and second recesses 62, 64 are defined in an interior of the body 42 so that the first and second recesses 62, 64 are isolated from the environment surrounding the fastener body 42.

The locking band 44 includes a coil or continuously curved portion 70 having a circular cross-section extending between a first tang or end portion 72 and a second tang or end portion 74. Though illustrated with a circular cross-section, other cross-sectional shapes are contemplated including square, rectangular, oval, triangular, and any other suitable shape.

Figure 4:
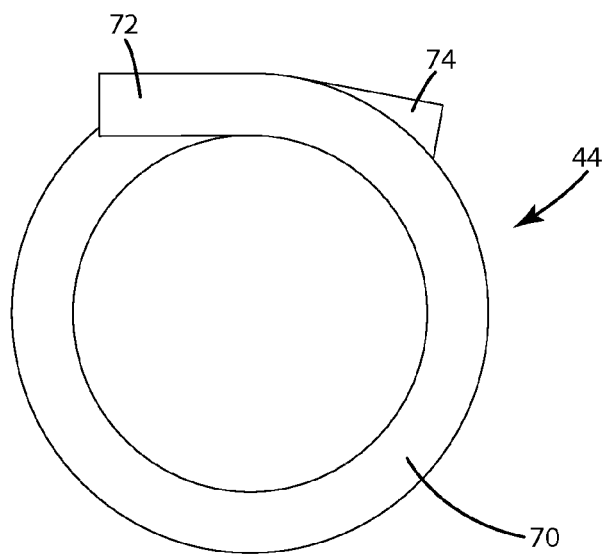
FIG. 4 is a top view of the locking element of the first embodiment.
Figure 5:
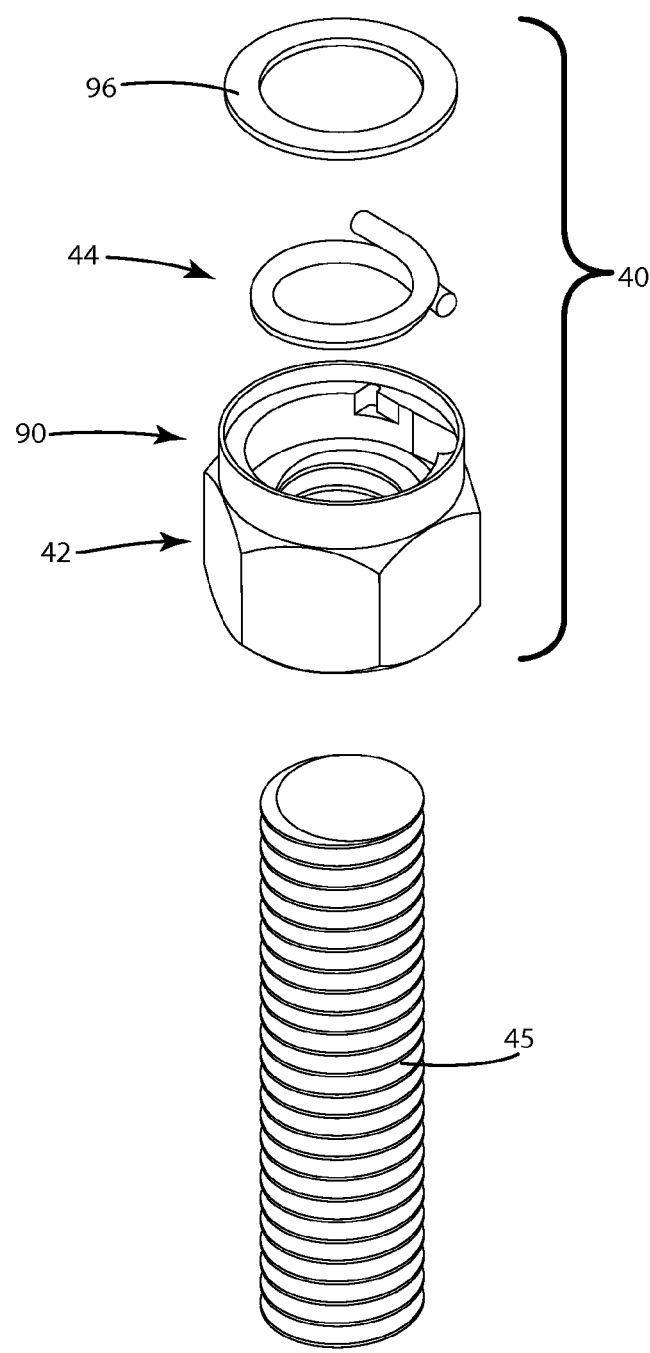
FIG. 5 is an exploded view of the first embodiment aligned with a threaded member.
Figure 6:
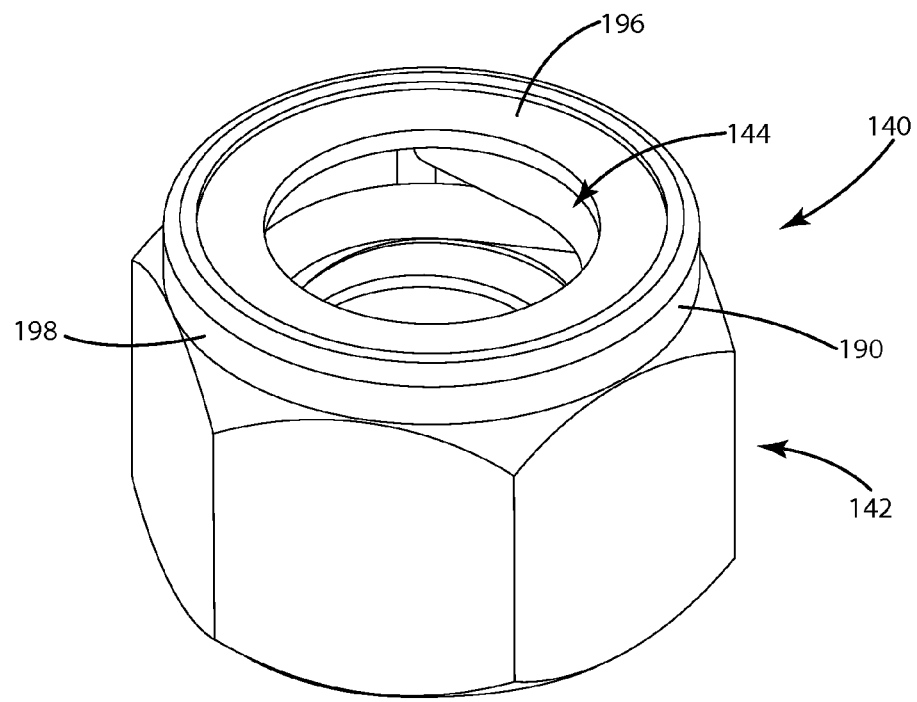
FIG. 6 is a perspective view of a second embodiment of the locking fastener.

In the current embodiment, the first and second tangs or end portions 72, 74 are straight, but other shapes, including smooth curves and angles, are also contemplated. Perhaps as best shown in FIG. 4, both tangs 72, 74 extend tangentially outward from the curved portion 70. Also as shown in FIG. 4, the locking band 44 may include a single turn, with the first tang 72 overlapping the second tang 74. The locking band 44 may alternatively include less than a single turn, or two or more helical turns so that adjacent turns are substantially in contact with each other. If the locking band 44 includes less than a single turn, the locking band 44 may extend entirely within a single plane oriented perpendicular to the bore 52, or may extend helically. As shown in FIG. 4, the locking band 44 may be symmetrical to simplify manufacturing.

The diameter of the circular cross-section of the locking band 44 generally corresponds to the pitch of the externally threaded member 45 so that the locking band 44 fits within the threads of the threaded member 45. In a locking band with a non-circular cross-section, the dimension of the surface engaging the threads of the threaded member 45 may be less than, generally the same as, or greater than the pitch of the threaded member.

Figure 2:
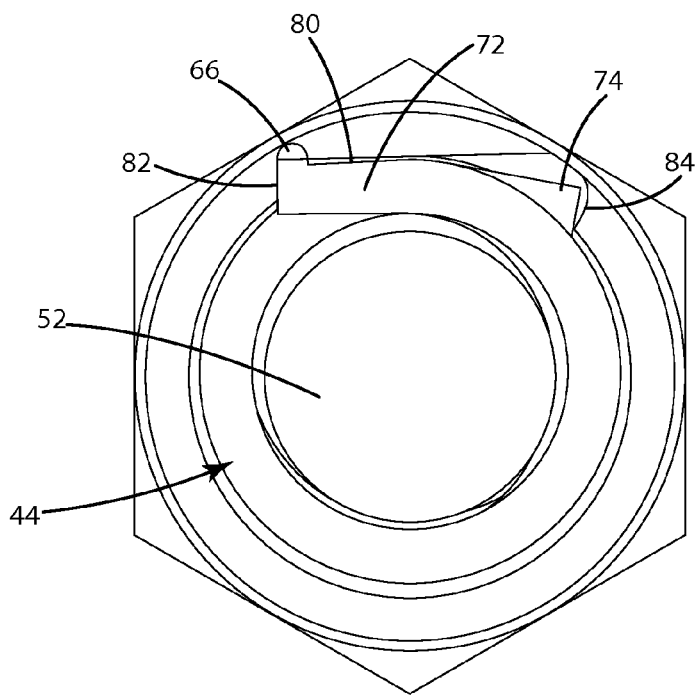
FIG. 2 is a top view of the first embodiment with the retainer cover removed and with a removal torque applied to the locking fastener.
Figure 3:
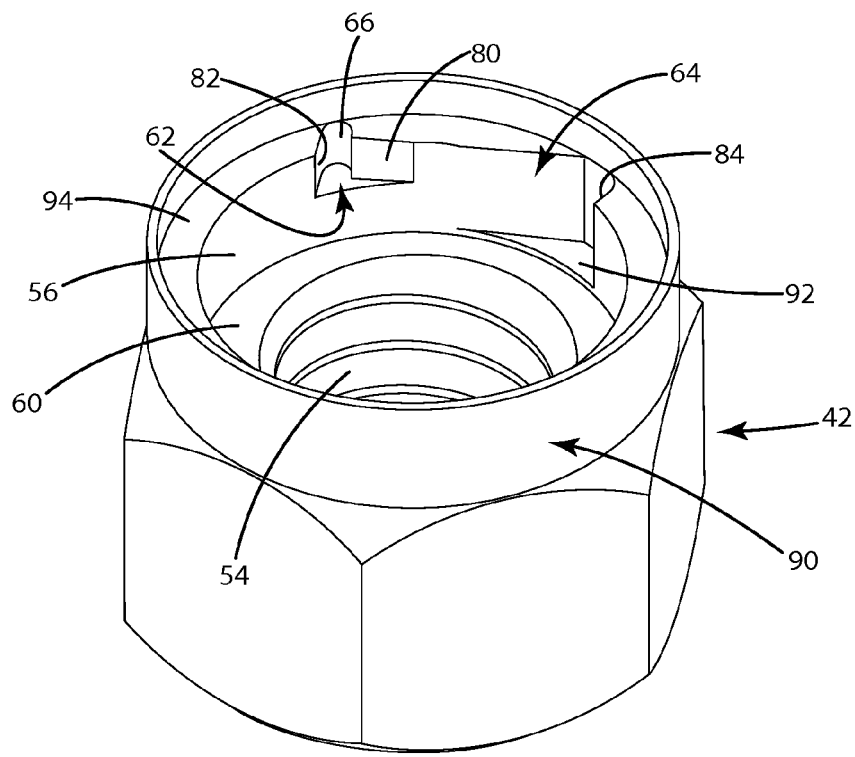
FIG. 3 is a perspective view of the first embodiment with the retainer cover and the locking element removed.

The tangentially-extending tang 72 is received and constrained within the first recess 62 in the fastener body 42. As shown in FIG. 3, the first recess 62 has a side wall 80 that constrains the angular movement of first tang 72 relative to the body 42. For example, during rotation of the fastener body 42 in an installation or clockwise direction and in a removal or counterclockwise direction, a side surface of first tang 72 may contact side wall 80. The first recess 62 may include a notch 66 to allow a side surface of first tang 72 to fit flush against side wall 80. The first recess 62 may have an end wall 82 instead of or in addition to side wall 80 that engages an end surface of the first tang 72 during rotation of the body 42. The end wall 82 may be substantially perpendicular to the side wall 80 as illustrated, or may be at an angle relative to the side wall 80. Optionally, the first recess 62 may be configured to engage a corner or any other suitable surface of the first tang 72 during rotation of the fastener body 42. As shown in FIG. 2, the first recess side wall 80 is oriented generally tangentially to the bore 52 so as to receive the tangential tang 72. Consequently, the tang 72 is angularly fixed with respect to the body 42.

The second tang 74 of the locking band 44 extends into the second recess 64. The second tang 74 is normally free to rotate angularly relative to the body 42 within the second recess 64. However, as described below and as shown in FIG. 2, the second tang 74 may contact the second recess wall 84 during removal or counterclockwise rotation of the body 42, which limits the angular movement of the second tang 74 relative to the body 42.

Although illustrated as two recesses 62, 64, the body 42 may instead define a combination of recesses and/or surfaces to receive each of the tangs 72, 74.

Installation of the threaded fastener 40 in a first or generally clockwise direction onto the externally threaded member 45 expands the locking band 44, so that the locking band 44 does not interfere with or inhibit movement of the threaded fastener 40 onto the externally threaded member 45. However, rotation of the threaded fastener 40 in a removal or generally counterclockwise direction operates to draw the locking band 44 securely against the threads, whereby the threaded fastener 40 is effectively prevented from undesired, unintentional, or unexpected loosening, for example, due to vibration.

The locking band 44 allows desired loosening of the threaded fastener 40 if sufficient torque is applied to the body 42. When the body 42 is rotated in a second or counterclockwise direction with sufficient torque, the first tang 72, which is angularly constrained by the first recess 62, may elastically deflect which in turn allows the body 42 to rotate through a small angle relative to the locking band 44. As shown in FIG. 2, this rotation forces the second tang 74, which extends tangentially from the coil portion 70, into contact with the second recess wall 84 in the nut body 42. As illustrated, the contact may be between an end surface of second tang 74 and a corner of the second recess 64, or may be between any two surfaces that would restrain the angular movement of the second tang 74 relative to the body 42. This contact reduces or potentially eliminates any further increase in stress on the locking element 44 as removal torque is applied to rotate the fastener 40 off the externally threaded member 45. Consequently, there is little or no damage to either the external thread or the locking element 44. The second recess 64 may be designed to control the removal torque to a predetermined or preselected level by allowing a predefined degree of movement of second tang 74.

When removal torque is applied and the band 44 elastically deflects, there is a small amount of sliding of the first tang 72 along the first recess side wall 80. This freedom to move tangentially reduces or potentially eliminates tension in the band 44 and assures smooth wear-free operation over multiple reuses. When the fastener 40 is fully disengaged with the external thread, the band 44 elastically returns to its original position.

The diameter of the locking band 44 may be selected so that a single locking band 44 may be used with all external thread classes within a particular thread size. It has been found that a single locking band 44 may "self-adjust" to accommodate various thread classes at least partially because the locking band 44 can slide along the first recess side wall 80. Alternatively, different locking bands 44 may be designed for use with different thread sizes, or different external thread classes within a particular thread size. Further, the cross-sectional shape, material strength, and elasticity of locking band 44 may be selected based on the desired application.

The body 42 and the locking band 44 may be manufactured from any suitable materials, including metals and composites. Additionally, because of the reduced stress in the locking band 44 during use of the threaded fastener 40, locking band 44 may be manufactured from relatively low-cost materials such as round steel wire.

The threaded fastener 40 includes a retainer portion 90. The retainer portion 90 may be an integral portion of the fastener body 42, or the retainer portion 90 may be separate from, extending from, the fastener body 42. As shown in FIGS. 1 and 3, the retainer portion 90 at least partially houses the locking band 44 and isolates the locking band 44. The retainer portion 90 may include a first lip 92 for supporting the second tang 74 and a retainer wall 56 for engaging the coil 70. A second lip 94 may be defined by the retainer wall 56 and adapted to support and engage a retainer cover 96. A retainer flange 98 may further support and engage the retainer cover 96. As illustrated, the retainer flange 98 may extend substantially parallel to the bore 52. The retainer flange 98 may optionally include an outer flange lip to provide a snap-fit retention of the retainer cover 96. Further optionally, the retainer cover 96 may be formed over the flange 98. As illustrated, the retainer cover 96 may conceal and protect the locking band 44 from the environment surrounding the fastener 40. The retainer cover 96 may be eliminated if the retainer flange 98 is made sufficiently tall to provide a desired level of protection for the locking band 44.

The retainer cover 96 may be any variety of suitable shapes, including a cylindrical washer-like shape as illustrated. The retainer cover 96 may be suitably sized for the application. For example, the inner diameter of the retainer cover 96 may be sized slightly larger than the threaded member 45 to allow for complete clearance of the threaded member 45 through the retainer cover 96. Optionally, the inner diameter of the retainer cover 96 may be sized to interact tightly with the threads of the threaded member 45. Further optionally, the inner diameter of the retainer cover 96 may be sized smaller than the threaded member 45. The retainer cover 96 may be made of any suitable material, including metals, composites and flexible materials. Especially if the inner diameter of the retainer cover 96 is sized smaller than the threaded member 45, the retainer cover 96 may be made of a flexible material (for example, an elastomer) to provide a seal against the threaded member 45 to prevent dirt and debris from entering the retainer portion 90.

Installation of the locking band 44 can be accomplished in a number of ways. In the current embodiment, the band 44 is installed by compressing it sufficiently to snap it into place in retaining portion 90. After the band 44 is in place, retainer cover 96 may be installed with a snap-fit, friction-fit, adhesive, or any other suitable securing mechanism. Optionally, the retainer cover 96 may be formed over the retainer flange 98. Further optionally, the locking band 44 could be wound in place.

The locking torque can be a function of a number of variables, including the initial diameter of the locking band, the material properties of the locking band, the coefficient of friction of the locking band, the number of turns of the locking band and the shape and size of the first and second recesses 62, 64. In addition, parameter tolerances will affect the range of locking torque for a particular configuration. Parameters for the locking band 44 can therefore be selected for each thread size and tolerance range to provide the slip torque less than the ultimate strength of the locking band 44 while still providing an acceptable locking torque range. In addition, the locking torque can be set to meet or to exceed relevant industry standards. The present locking threaded fastener 40 includes a one-way prevailing torque, which may allow installation torque to be very low when compared to standard prevailing torque threaded fasteners. In addition, the locking band fastener removal prevailing torque is less subject to degradation over multiple uses when compared to a typical locking fastener.

II. Second Embodiment

A locking threaded fastener constructed in accordance with a second embodiment of the invention is illustrated in FIGS. 6-10 and generally designated 140. The threaded fastener 140 is structurally and functionally similar to the previously described threaded fastener 40. Consequently, each element of the threaded fastener 140 is identified by the same designating numeral as the corresponding element in the threaded fastener 40 with the exception that the numeral begins with a 1. For example, the locking band 144 in the threaded fastener 140 corresponds to the locking band 44 in the threaded fastener 40. Only the elements that differ significantly are described below.

Figure 7:
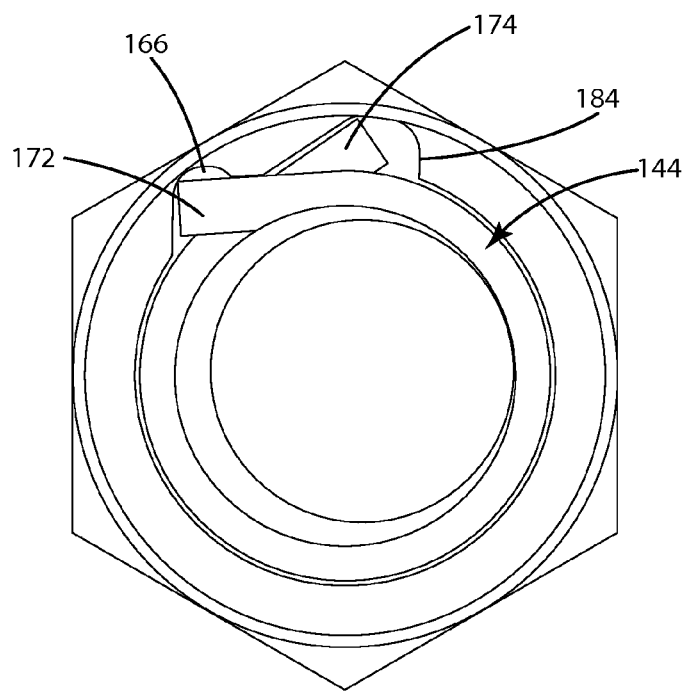
FIG. 7 is a top view of the second embodiment with the retainer cover removed and without removal torque applied to the locking fastener.
Figure 8:
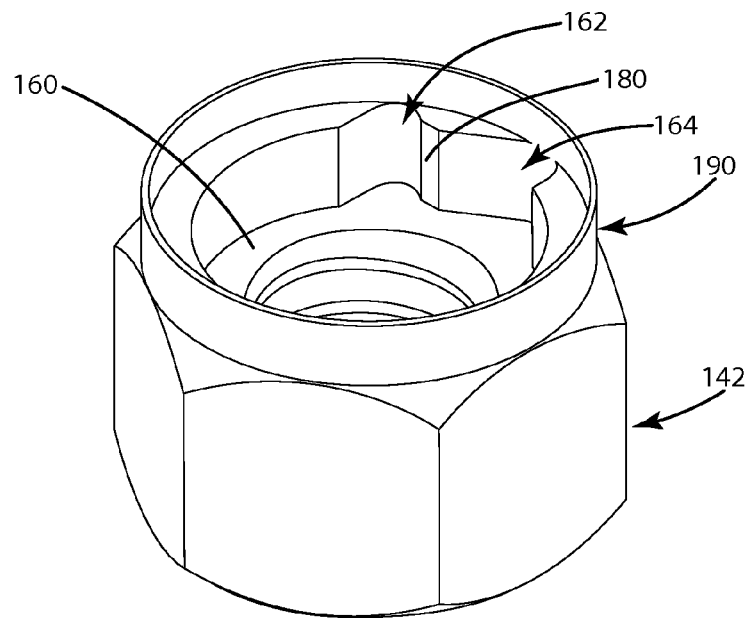
FIG. 8 is a perspective view of the second embodiment with the retainer cover and the locking element removed.
Figure 9:
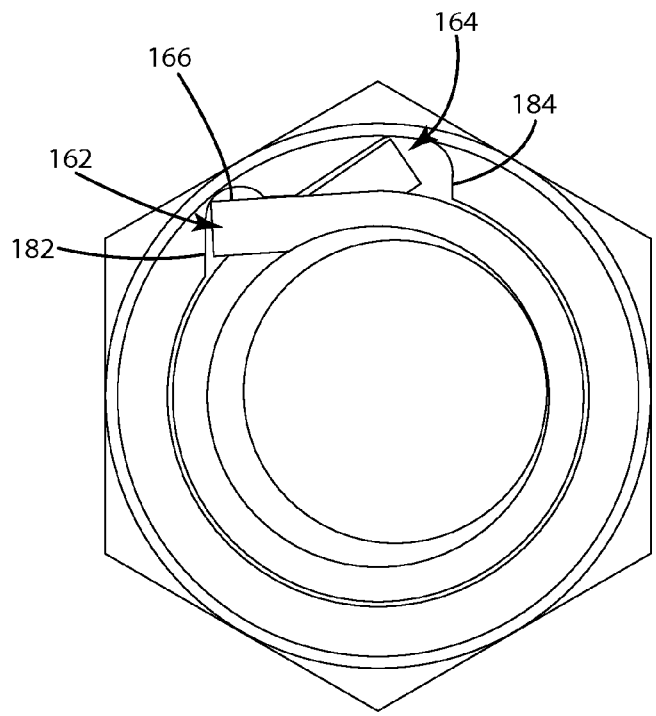
FIG. 9 is a top view of the second embodiment with the retainer cover and the locking element removed.
Figure 10:
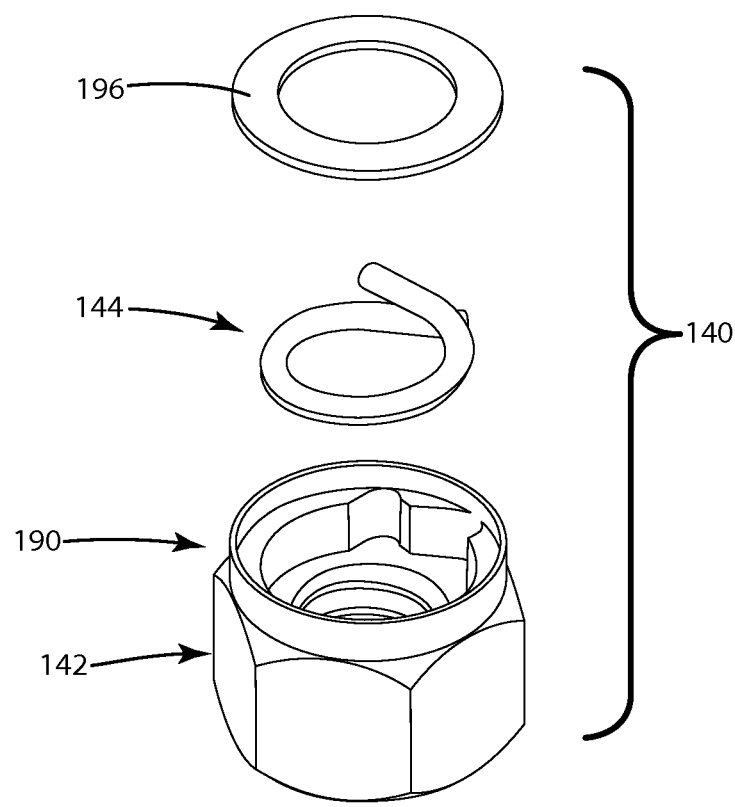
FIG. 10 is an exploded view of the second embodiment aligned with a threaded member.
Figure 10:
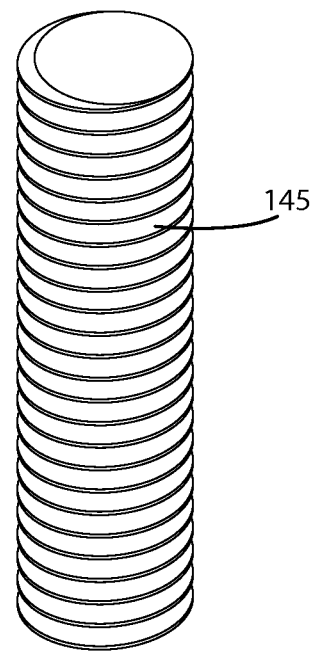

As shown in FIGS. 7-9, the threaded fastener 140 includes a first recess 162 and a second recess 164 with different sizes and shapes than the recesses 62, 64 in the first embodiment. The different recesses 162, 164 may result in a different removal torque for the threaded fastener 140. For example, the recesses 162, 164 are configured to allow the locking band 144 to expand so that the two tangs 172, 174 are expanded past parallel with one another. The different contours of the second recess 164 may also result in a different interaction between the second tang 174 and the second recess wall 184 and may create a different locking torque. As shown in FIG. 8, the first recess 162 may extend completely to the lower lip 160. As shown in FIG. 1, the retainer flange 198 may be made shorter than in the first embodiment to provide the retainer portion 190 with a relatively lower profile.

III. Third Embodiment

Figure 11:
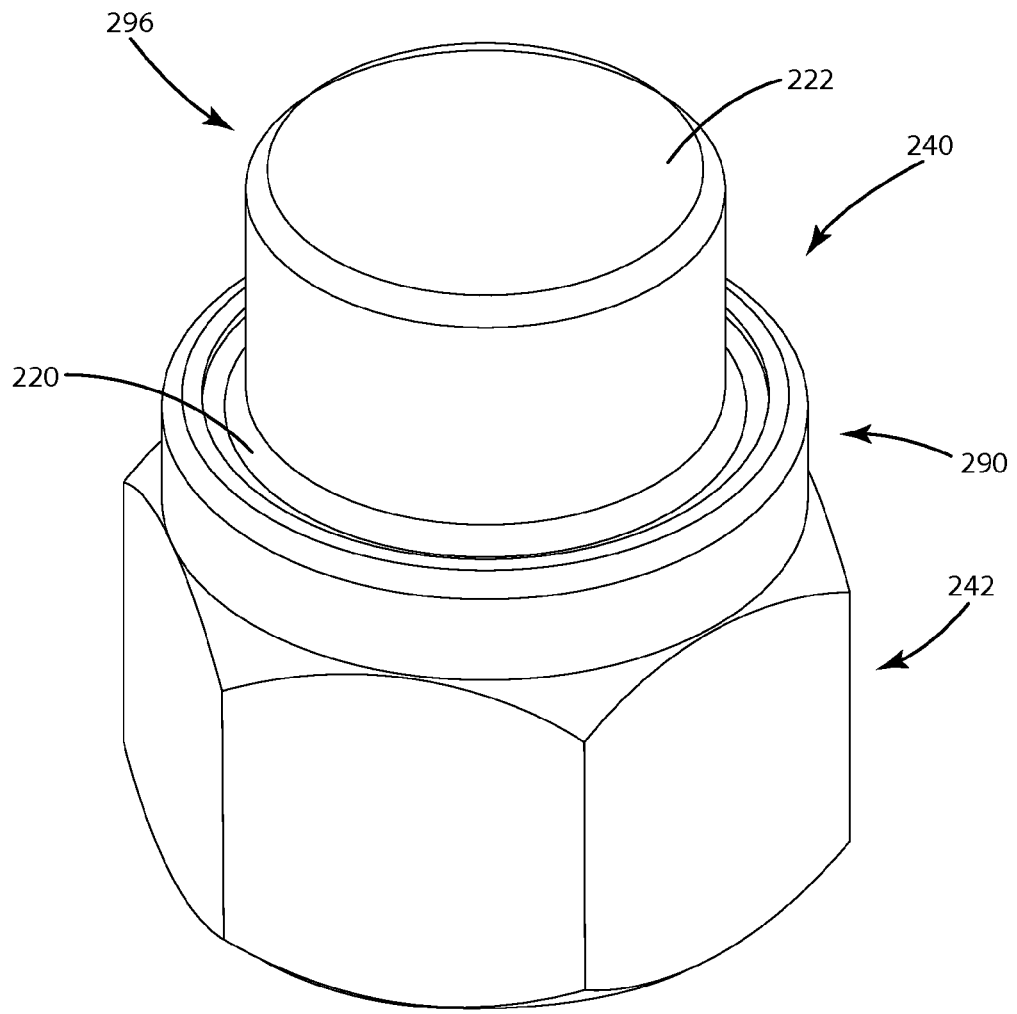
FIG. 11 is a perspective view of a third embodiment of the locking fastener.

A locking threaded fastener constructed in accordance with a third embodiment of the invention is illustrated in FIG. 11 and generally designated 240. The threaded fastener 240 is structurally and functionally similar to the previously described threaded fastener 40. Consequently, each element of the threaded fastener 240 is identified by the same designating numeral as the corresponding element in the threaded fastener 40 with the exception that the numeral begins with a 2. Only the elements that differ significantly are described below.

The threaded fastener 240 includes a cover 296 that encloses the locking element 244. As shown in FIG. 11, the cover 296 includes a lip portion 220 and a cover portion 222. To accommodate the portion of a threaded member 245 extending through the threaded fastener 240, the cover portion 222 may extend outward away from the lip portion 220. The distance the cover portion 222 extends away from the lip portion 220 may be designed to accommodate various sizes of threaded members 245. The cover portion 222 may be any of a variety of shapes, including substantially cylindrical, as shown in FIG. 11.

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Directional terms, such as "vertical," "horizontal," "top," "bottom," "upper," "lower," "inner," "inwardly," "outer," "outwardly," "clockwise," and "counterclockwise" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the," or "said," is not to be construed as limiting the element to the singular unless expressly stated in the issued claims.

The embodiments of the invention in which an exclusive property or privilege is claimed are defined as follows:

1. A locking threaded fastener comprising:
   a fastener body having a threaded portion and an unthreaded portion defining a bore, the fastener body further having a shoulder and defining first and second recesses open through the shoulder and communicating with the bore, the first and second recesses are isolated from the environment surrounding the fastener body;
   a single locking element including a coil portion and first and second tangs extending from the coil portion, the locking element located within the bore, the first and second tangs extending into the first and second recesses respectively to engage the fastener body upon rotation of the fastener body, the locking element circumferentially surrounded without interruption by the fastener body; and
   a retainer at least partially covering the locking element and retaining the locking element within the bore and the first and second tangs within the first and second recesses respectively.

2. The locking fastener of claim 1 wherein the first and second tangs extend generally tangentially from the coil portion.

3. The locking fastener of claim 1 wherein the retainer snap fits within the fastener body.

4. The locking fastener of claim 1 wherein the retainer is elastic.

5. The locking fastener of claim 1 wherein the retainer is uninterrupted to completely cover the locking element.

6. The locking fastener of claim 1 wherein the first tang is angularly fixed with respect to the fastener body, and the second tang has a range of angular movement with respect to the fastener body.

7. The locking fastener of claim 6 wherein the second recess includes a second recess wall, the second tang adapted to contact the second recess wall during loosening of the locking fastener.

8. The locking fastener of claim 6 wherein the first recess includes a first recess wall, the first tang adapted to contact the first recess wall during tightening and loosening of the locking fastener.

9. The locking threaded fastener of claim 1 wherein the retainer includes a lip retaining the locking element.

10. The locking fastener of claim 1 wherein the retainer defines an aperture having an internal diameter corresponding to the diameter of the threaded portion of the bore.

11. The locking fastener of claim 10 wherein the retainer is elastic and adapted to seal against a threaded member on which the locking fastener is mounted.

12. The locking threaded fastener of claim 9 wherein the retainer wall defines a second shoulder that engages the retainer.

* * * * *